W. A. ZIMMERMANN.
TRANSPARENCY HOLDER FOR PICTURE MACHINES.
APPLICATION FILED AUG. 21, 1911.
1,032,798.
Patented July 16, 1912.
2 SHEETS—SHEET 1.
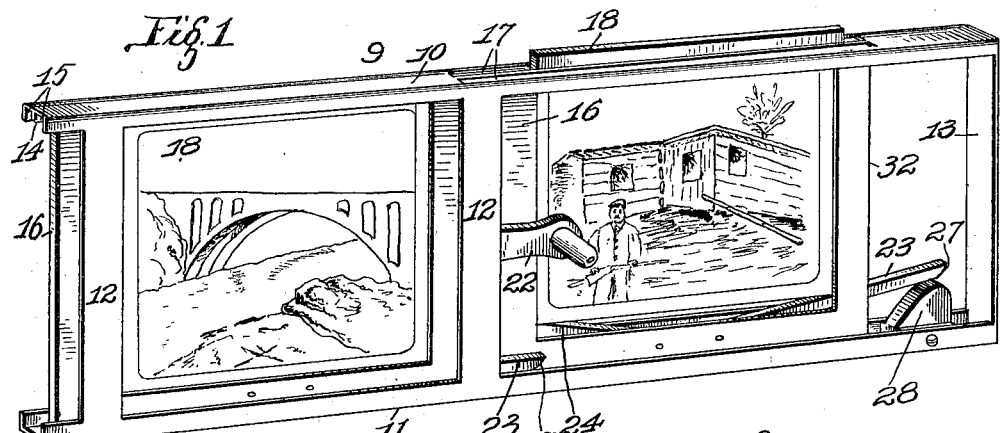
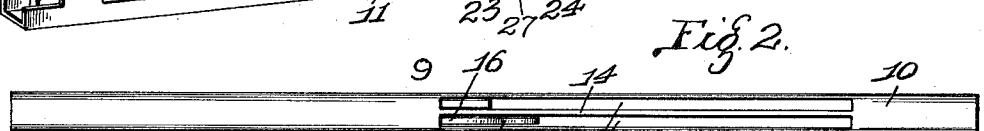
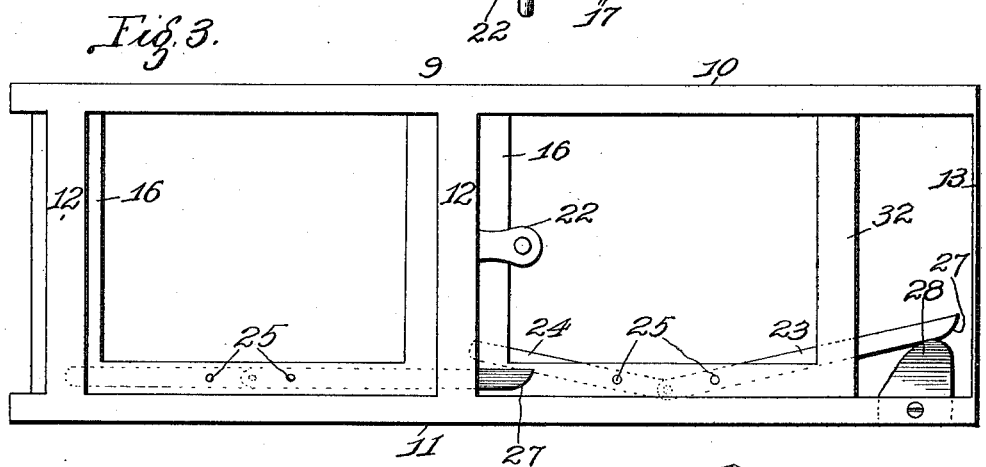
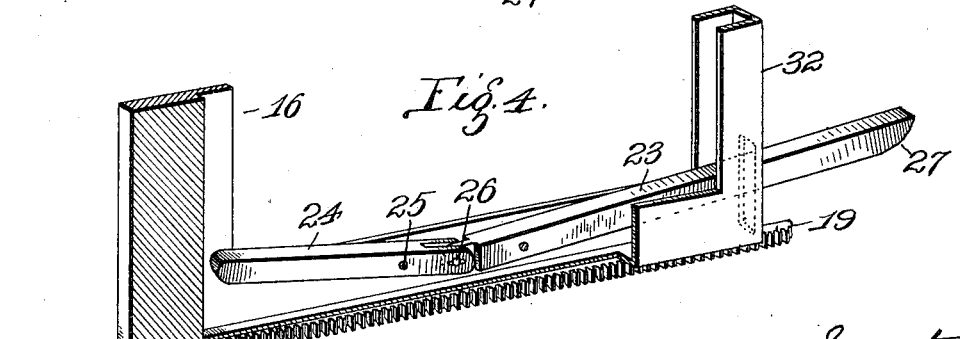

W. A. ZIMMERMANN.
TRANSPARENCY HOLDER FOR PICTURE MACHINES.
APPLICATION FILED AUG. 21, 1911.
1,032,798.
Patented July 16, 1912.
2 SHEETS—SHEET 2.
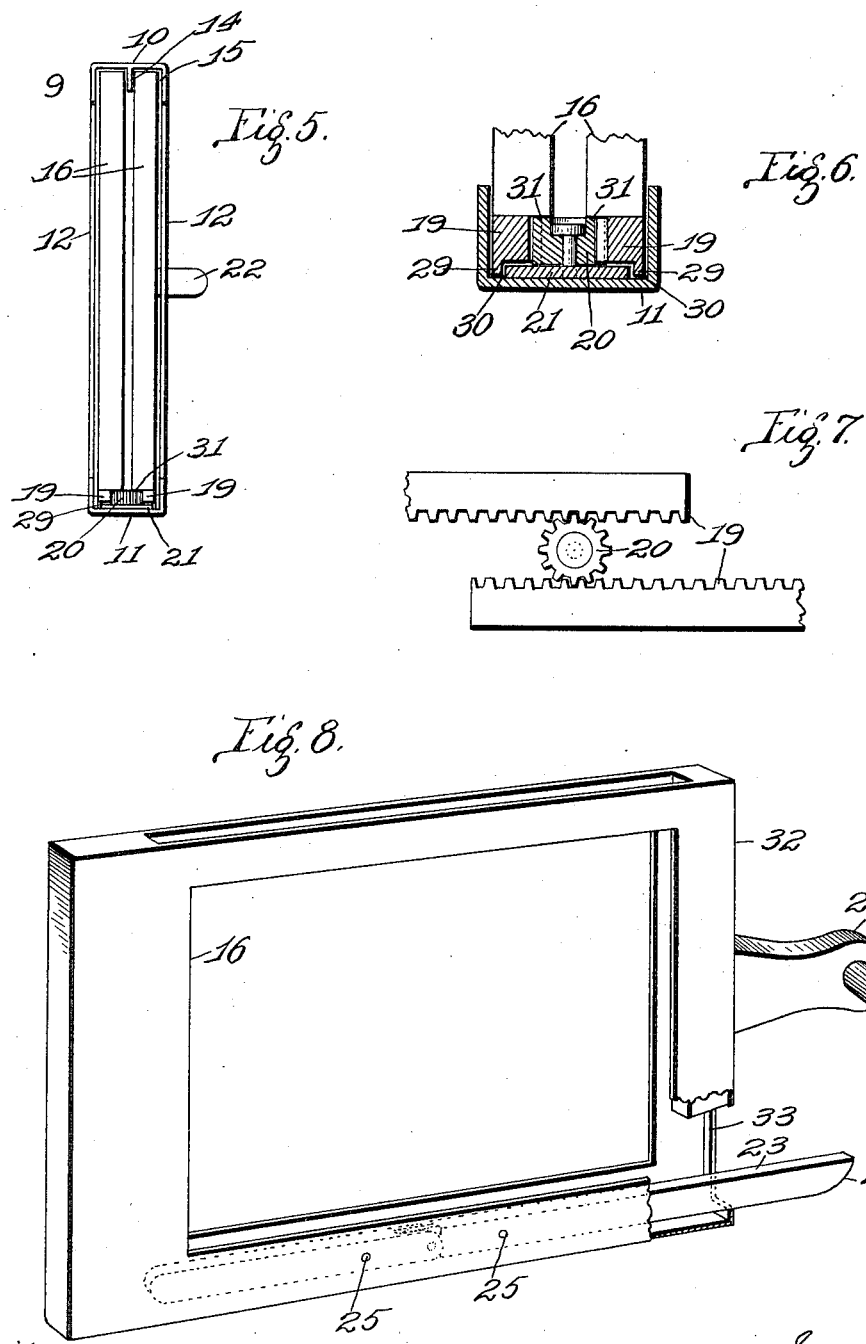

UNITED STATES PATENT OFFICE.

WILLIAM A. ZIMMERMANN, OF ST. LOUIS, MISSOURI.

TRANSPARENCY-HOLDER FOR PICTURE-MACHINES.

1,032,798.  Specification of Letters Patent.  Patented July 16, 1912.

Application filed August 21, 1911. Serial No. 645,292.

*To all whom it may concern:*

Be it known that I, WILLIAM A. ZIMMERMANN, a citizen of the United States, and resident of St. Louis, Missouri, have invented certain new and useful Improvements in Transparency-Holders for Picture-Machines, of which the following is a specification.

This invention relates to improvements in transparency holders for picture machines and has for its object a frame in which is mounted transparency holders provided with a mechanism for holding the transparency in a raised position when inserting or removing the same, and permit the same to be lowered when being advanced in front of the lens.

A further object of my invention is to construct a device having holders in which transparencies are supported to simultaneously operate in opposite directions when advancing and removing the transparency from its relative position with the lens.

A further object is to provide a holder having a mechanism which will hold the transparency in a raised position so that the same can be readily and easily inserted and removed without the fingers contacting with the view on the transparency.

Figure 1 is a perspective view of my invention. Fig. 2 is a top plan view of the same. Fig. 3 is a side view. Fig. 4 is a sectional perspective view of the lower portion of the holder showing the lever mechanism by which the transparency is supported and the rack mechanism by which the holder is operated in the frame. Fig. 5 is an end view. Fig. 6 is an enlarged detail sectional view of the lower portion of the frame showing the relative position of the racks and pinion by which the transparency holders are operated in opposite directions. Fig. 7 is a detail top plan view of the racks and pinion. Fig. 8 is a detail perspective view of one of the holders in which the transparencies are supported.

In the construction of my invention I provide a suitable elongated frame 9 consisting of a top 10, a bottom 11 and side members 12 by which the top and bottom is rigidly connected; the said top and bottom is also connected at the end by the bar 13. The top and bottom are suitably flanged forming channels, the top 10 divided by the center division wall 14 forming two guide grooves 15 in which the transparency holders 16 operate. The top 10 is also provided with a pair of elongated slots or openings 17 through which the transparency 18 is inserted and removed. Each of the holders 16 are provided at their bottoms with a rack bar 19, the teeth of which mesh with the gear pinion 20, which is axially mounted on the supporting plate 21 formed in the bottom 11. The rack bars 19 are so arranged as to continuously mesh with the pinion 20 and when the holder provided with the handle 22 is operated, both of said holders simultaneously operate in opposite directions so that when the holder in front of the lens is being withdrawn, the second holder is simultaneously advancing in front of the lens.

Each of the holders are suitably channeled to receive the transparency, and in the bottom portion of the holder is located a lever mechanism consisting of the long bar 23 and the short bar 24, each being pivotally connected to the holder by the pivots 25. The contacting ends of both bars are pivotally connected by the pin 26 and so arranged as to operate simultaneously from a horizontal to a tilted position whenever the curved end 27 of the long bar contacts with the cam 28 mounted in the front end of the frame. The transparency when placed in the holder rests upon these bars, and when the transparency is inserted it assumes the position as shown in Fig. 1, the upper portion projecting slightly beyond the upper portion of the frame so that the operator can, by means of the thumb and finger remove or replace the transparency without bringing his fingers in contact with the view. The transparency remains in this position until the holder is advanced sufficiently that the bar is released from the cam.

By referring to Fig. 6 the relative position of the racks with the pinion is clearly shown, the bottom end of each rack is provided with an elongated projection 29, which operates in the groove 30 formed between the plate 21 and the flanges of the bottom section. By this means the racks are at all times kept in contact with the pinion, and the bottom edges of the holders are arranged to ride on the top of the pinion at the point indicated by the numeral 31.

The long bars 23 of the lever mechanism project through the front end 32 of the holders and operate through the slots 33 formed therein.

The operation of my invention is as follows: The frame is placed in the picture machine so that the forward holder is in proper alinement with the lenses. A transparency is inserted in the holder which has its lever mechanism in contact with the cam, this holder assuming the position as shown in Fig. 1. The operator when desiring to remove the first transparency draws upon the handle 22, removing the view out of alinement with the lens, simultaneously advancing the other holder together with its transparency in front of the lens. The transparency will normally drop to its proper position as soon as the bar 23 has left the cam. When this view is in front of the lens the holder with the handle 22 comes in contact with the cam so that its lever mechanism rises to a tilted position raising the transparency so that its top projects above the top of the frame, the operator then removes the same and replaces another transparency. By this operation the views are placed in front of the lens by the operation of the handle 22, all of this being done from one side of the machine, thus overcoming the difficulty of working the slides from both sides, which is now the system.

The mere operation of the handle operates both holders simultaneously, this being accomplished by means of the rack and pinion mechanism located in the bottom of the frame.

The essential feature of my invention is to construct a frame in which is mounted a pair of transparency holders each operating simultaneously but in opposite directions, and each provided with a mechanism by which the transparency is raised above the frame when out of alinement with the lens so that the operator can readily and easily remove and replace the same without bringing the fingers in contact with the surface of the plate and soiling the same.

Having thus fully described my invention, what I claim as new and desire to have secured to me by the grant of Letters Patent, is:

1. A transparency holder for picture machines comprising a frame, a pair of transparency holders located in said frame, means for operating the holders in opposite directions simultaneously, and means located in the holders for raising the transparencies above the frame, when out of alinement with the lens of the picture machine.

2. A transparency holder for picture machines comprising a frame, a plurality of transparency holders located within said frame, means located in the frame and on the holders whereby said holders are operated in opposite directions simultaneously, a lever mechanism located in the holders on which the transparencies are mounted, said lever mechanisms raising the transparencies above the top of the frame when out of alinement with the lens of the picture machine, substantially as specified.

3. A transparency holder for picture machines comprising an elongated frame, transparency holders located therein, racks secured to the holders, a pinion located in the frame with which the teeth of the racks mesh, a cam located in the frame, a lever mechanism located in each of the holders and placed in tilted position when brought in contact with the cam, and a handle for operating the holders in opposite directions simultaneously, substantially as specified.

4. A transparency holder for picture machines comprising an elongated frame, holders slidably mounted in said frame, a cam located in one end of said frame, levers pivotally mounted in the bottom of each of the holders, a rack bar attached to the bottom end of each of said holders, a pinion axially mounted in the frame, and arranged to mesh with the teeth of the racks of the holders, a handle located on one of the holders by which the same is operated, the said levers arranged to tilt when brought in contact with the cam for raising the transparency above the frame, substantially as specified.

In testimony whereof, I have signed my name to this specification, in presence of two subscribing witnesses.

WILLIAM A. ZIMMERMANN.

Witnesses:
 ALFRED A. EICKS,
 WALTER C. STEIN.

Copies of this patent may be obtained for five cents each, by addressing the "Commissioner of Patents, Washington, D. C."